US009667859B1

(12) United States Patent
Matias et al.

(10) Patent No.: US 9,667,859 B1
(45) Date of Patent: May 30, 2017

(54) SYSTEMS AND METHODS FOR DETERMINING PREFERENCES FOR CAPTURE SETTINGS OF AN IMAGE CAPTURING DEVICE

(71) Applicant: GOPRO, INC., San Mateo, CA (US)

(72) Inventors: Joven Matias, Cardiff, CA (US); Suejin Kim, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/980,854

(22) Filed: Dec. 28, 2015

(51) Int. Cl.
H04N 5/232 (2006.01)

(52) U.S. Cl.
CPC ..... *H04N 5/23216* (2013.01); *H04N 5/23203* (2013.01)

(58) Field of Classification Search
CPC .... H04N 21/60; H04N 21/63; H04N 21/8186; H04N 2005/4405; H04N 2005/4407; H04N 2005/4423; H04N 2005/4425; H04N 2005/4428; H04N 2005/4432; H04N 21/42204; H04N 21/42207; H04N 21/42208; H04N 21/42218; H04N 21/42219; H04N 21/4222; H04N 21/42222; H04N 21/42224; H04N 21/42225; H04N 21/42226; H04N 21/42228; H04N 21/441; H04N 2201/0075; H04N 5/232; H04N 5/23216; H04N 5/23203; H04N 5/23209; H04N 5/23219; H04N 5/23222; H04N 1/00381; H04N 1/00403; H04N 1/00411; H04N 5/23245; H04N 1/00095; B25J 19/02; B25J 19/021; B25J 19/023; B25J 5/00; B60L 15/40; B60T 7/16; G08B 13/19689; G06K 9/32; G06K 9/3208
See application file for complete search history.

(56) References Cited

U.S. PATENT DOCUMENTS

| 5,432,871 | A | * | 7/1995 | Novik | H04N 1/32771 348/14.13 |
| 6,384,862 | B1 | * | 5/2002 | Brusewitz | H04N 5/23293 345/157 |
| 6,563,528 | B2 | * | 5/2003 | Satoda | H04N 7/15 348/14.05 |
| 6,798,897 | B1 | * | 9/2004 | Rosenberg | G06T 7/0028 348/154 |
| 7,092,012 | B2 | * | 8/2006 | Nakamura | H04N 7/147 348/211.3 |

(Continued)

*Primary Examiner* — Gevell Selby
(74) *Attorney, Agent, or Firm* — Sheppard Mullin Richter & Hampton LLP

(57) ABSTRACT

A first portion of a first video segment may be obtained from a user. A second portion of a second video segment may be obtained from the user. The first portion and the second portion may be aggregated to form an aggregated video segment. A first set of capture settings associated with capture of the first portion may be obtained. A second set of capture settings associated with capture of the second portion may be obtained. Preferences for capture settings of an image capturing device may be determined based upon the first and second set of capture settings. Instructions may be transmitted to the image capturing device. The instructions may include the determined preferences for the capture settings and may be configured to cause the image capturing device to adjust the capture settings to the determined preferences.

18 Claims, 5 Drawing Sheets

(56) References Cited

U.S. PATENT DOCUMENTS

| | | | | |
|---|---|---|---|---|
| 7,623,176 B2* | 11/2009 | Hoshino | ............... | G11B 27/11 348/231.3 |
| 8,044,992 B2* | 10/2011 | Kurebayashi | ......... | H04N 5/232 348/211.8 |
| 8,443,398 B2* | 5/2013 | Swenson | ............... | H04L 47/10 348/384.1 |
| 8,644,702 B1* | 2/2014 | Kalajan | ........... | H04N 21/64784 396/429 |
| 9,001,217 B2* | 4/2015 | Kinoshita | ......... | H04N 5/23293 348/207.11 |
| 9,106,872 B2* | 8/2015 | Tsurumi | ............ | G06K 9/00335 |
| 2004/0061667 A1* | 4/2004 | Sawano | ............... | H04M 1/72544 345/30 |
| 2004/0174434 A1* | 9/2004 | Walker | ............. | G06F 17/30265 348/211.3 |
| 2004/0239763 A1* | 12/2004 | Notea | ................... | H04N 5/222 348/169 |
| 2006/0195876 A1* | 8/2006 | Calisa | ............. | G08B 13/19656 725/105 |
| 2007/0279494 A1* | 12/2007 | Aman | ................... | G01S 3/7864 348/169 |
| 2009/0217343 A1* | 8/2009 | Bellwood | ............... | G06F 21/10 726/1 |
| 2013/0132462 A1* | 5/2013 | Moorer | ............. | H04N 21/2343 709/203 |
| 2013/0314442 A1* | 11/2013 | Langlotz | ............... | G06T 19/006 345/633 |
| 2014/0049652 A1* | 2/2014 | Moon | ................. | H04N 9/8233 348/207.1 |
| 2014/0267544 A1* | 9/2014 | Li | ..................... | H04M 1/72544 348/14.02 |
| 2014/0270480 A1* | 9/2014 | Boardman | ............. | G06T 17/00 382/154 |
| 2015/0296134 A1* | 10/2015 | Cudak | ............... | H04N 5/23222 348/207.1 |
| 2015/0341550 A1* | 11/2015 | Lay | .................... | H04N 5/23216 348/222.1 |
| 2016/0104284 A1* | 4/2016 | Maguire | ........... | H04N 5/23222 348/187 |
| 2016/0117829 A1* | 4/2016 | Yoon | .................... | G06K 9/4604 348/222.1 |
| 2016/0308813 A1* | 10/2016 | Kalajan | ................. | H04L 51/24 |

\* cited by examiner

SYSTEMS AND METHODS FOR DETERMINING PREFERENCES FOR CAPTURE SETTINGS OF AN IMAGE CAPTURING DEVICE

FIELD

The disclosure relates to systems and methods for determining preferences for capture settings of an image capturing device based upon content edited by a user.

BACKGROUND

Image capturing devices are used to capture images and/or videos of its surroundings. They may be used to capture special moments, sporting events, concerts, etc. Image capturing devices may be preconfigured with particular capture settings. The preconfigured capture settings may not be individualized for each user of the device. Configuration may take place through manual manipulation by the user. Adjustment of capture settings may impact the tone, hue, exposure level, sharpness, depth of field, frame rate, resolution, color depth, and/or other aspects of images and/or videos.

SUMMARY

The disclosure relates to determining preferences for capture settings of an image capturing device based upon editing of previously captured content, in accordance with one or more implementations. Portions of video segments may be obtained from a user selection. Capture settings associated with capture of the obtained portions of video segments may be obtained. Based upon a determination of the obtained portions of the video segments selected by the user (e.g., the user selected particular portions of video segments over other portions of the video segments), preferences for the capture settings of the image capturing device may be determined based upon the capture settings associated with the obtained portions. Instructions may be transmitted to the image capturing device including the determined preferences for the capture settings. The instructions may be configured to cause the image capturing device to adjust the capture settings to the determined preferences.

In some implementations, a system configured to determine preferences for capture settings of an image capturing device based upon editing of previously captured content may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of an authentication component, a segment component, an aggregation component, a capture settings component, a preferences component, a transmission component, and/or other components.

The authentication component may be configured to authenticate a user associated with one or more client computing platforms accessing one or more images and/or video segments via the system. The authentication component may manage accounts associated with users and/or consumers of the system. The user accounts may include user information associated with users and/or consumers of the user accounts. User information may include information stored by the server(s), one or more client computing platforms, and/or other storage locations.

The segment component may be configured to obtain a first portion of a first video segment from a user. The segment component may be configured to obtain a second portion of a second video segment from the user. The first video segment and the second video segment may be available within the repository of video segments available via the system and/or available on a third party platform, which may be accessible and/or available via the system. The segment component may be configured to receive a selection of the first portion of the first video segment and/or the second portion of the second video segment from the user. The user may select the first portion of the first video segment and/or second portion of the second video segment via a user interface associated with the system available via one or more client computing platform(s). The first portion and/or the second portion may be stored by server(s), client computing platform(s), and/or other storage locations.

The aggregation component may be configured to aggregate the first portion and the second portion to form an aggregated video segment. The aggregation component may receive a selection of an order in which to aggregate the first portion and the second portion. If the aggregation component does not receive an order to aggregate the first portion and the second portion, the aggregation component may be configured to aggregate the first portion and the second portion automatically based upon the order in which the portions were received by the system, based upon user defined settings of the system, and/or other configurations of the system. Any number of portions of any number of video segments may be included within the aggregated video segment. The aggregated video segment may be included within the repository of images and/or video segments available via the system. The aggregated video segment may be stored by server(s), client computing platform(s), and/or other storage locations.

The capture settings component may be configured to obtain a first set of capture settings associated with capture of the first portion of the first video segment. The capture settings component may be configured to obtain a second set of capture settings associated with capture of the second portion of the second video segment. The capture settings component may be configured to obtain capture settings associated with other portions of the first video segment and the second video segment that were not selected and/or obtained to be included within the aggregated video segment. Capture settings may define aspects of operation for one or more of a processor of the image capturing device that captured a video segment, an imaging sensor of the image capturing device that captured the video segment and/or portions of the video segment, and/or an optical element of the first capturing device that captured the video segment and/or portions of the video segment. Capture settings of the image capturing device may include one or more of a shutter speed, a resolution, a frame rate, white balance, an exposure, a field of view, an aperture, focus modes, and/or other capture settings.

The preferences component may be configured to determine the preferences for the capture settings of the image capturing device based upon the first set of capture settings, the second set of capture settings, and/or the differences between the capture settings associated with the other portions of the first video segment and the second video segment that were not included within the aggregated video segment. For example, the preferences for the capture settings for the image capturing device may be determined based upon the obtained first set of capture settings associated with the first portion of the first video segment, such that the preferences for the capture settings may be determined to be the same as the first set of capture settings. The preferences for the capture settings for the image capturing device may be determined based upon the obtained second set of capture settings associated with the second portion of the second video segment, such that the preferences for the capture settings may be determined to be the same as the second set of capture settings. The preferences for the capture settings for the image capturing device may be a combination of the first set of capture settings, the second set of capture settings, and/or the differences between the capture settings associated with the other portions of the first video segment and the second video segment that were not included within the aggregated video segment. The combination may be based upon commonalities between the first set of capture settings and the second set of capture settings, such that the preferences for the capture settings for the image capturing device may be determined to be the common capture settings between the first set of capture settings and the second set of capture settings. The combination may be based upon commonalities between the differences between the capture settings associated with the other portions of the first video segment and the second video segment that were not included within the aggregated video segment. The preferences for the capture settings may be associated with the user who selected the first portion of the first video segment and the second portion of the second video segment.

The transmission component may be configured to effectuate transmission of instructions to the image capturing device. The instructions may include the determined preferences for the capture settings. The instructions may be configured to cause the image capturing device to adjust the capture settings of the image capturing device to the determined preferences. The instructions may be configured to cause the image capturing device to automatically adjust the capture settings of the image capturing device to the determined preferences the next time the image capturing device is activated (e.g., turned on, in use, and/or capturing an image and/or video segment) or each time the image capturing device is activated. The image capturing device may adjust the capture settings prior to capturing an image and/or video segment. The instructions may be configured to cause the image capturing device to automatically adjust the capture settings of the image capturing device to the determined preferences based upon current contextual information associated with the image capturing device and current capture settings of the image capturing device. Contextual information associated with capture of video segments may define one or more temporal attributes and/or spatial attributes associated with capture the video segments. Contextual information may include any information pertaining to an environment in which the video segment was captured. Contextual information may include visual and/or audio information based upon the environment in which the video segment was captured. Temporal attributes may define a time in which the video segment was captured (e.g., date, time, time of year, season, etc.). Spatial attributes may define the environment in which the video segment was captured (e.g., location, landscape, weather, surrounding activities, etc.). The one or more temporal attributes and/or spatial attributes may include one or more of a geolocation attribute, a time attribute, a date attribute, and/or a content attribute.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
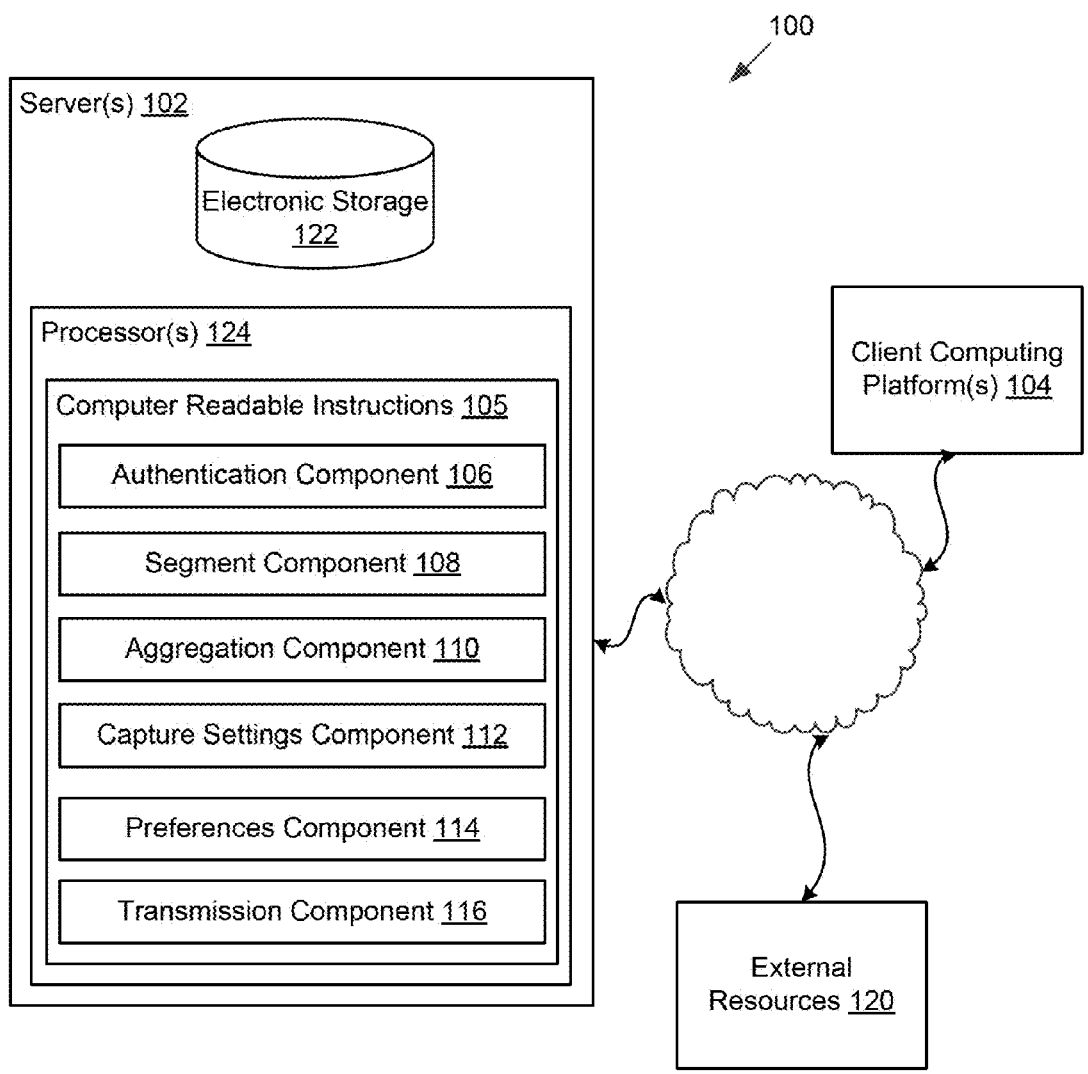
FIG. 1 illustrates a system for determining preferences for capture settings of an image capturing device, in accordance with one or more implementations.

FIG. 1 illustrates a system 100 for determining preferences for capture settings of an image capturing device based upon editing of previously captured content, in accordance with one or more implementations. As is illustrated in FIG. 1, system 100 may include one or more servers 102. Server(s) 102 may be configured to communicate with one or more client computing platforms 104 according to a client/server architecture. The users of system 100 may access system 100 via client computing platform(s) 104. Server(s) 102 may be configured to execute one or more computer program components. The computer program components may include one or more of authentication component 106, segment component 108, aggregation component 110, capture settings component 112, preferences component 114, transmission component 116, and/or other components.

A repository of images and/or video segments may be available via system 100. The repository of images and/or video segments may be associated with different users. The video segments may include a compilation of videos, video segments, video clips, and/or still images. While the present disclosure may be directed to video and/or video segments, one or more other implementations of system 100 and/or server(s) 102 may be configured for other types of media items. Other types of media items may include one or more of audio files (e.g., music, podcasts, audio books, and/or other audio files), multimedia presentations, photos, slideshows, and/or other media files. The video segments may be received from one or more storage locations associated with client computing platform(s) 104, server(s) 102, and/or other storage locations where video segments may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms.

Authentication component 106 may be configured to authenticate a user associated with client computing platform 104 accessing one or more images and/or video segments via system 100. Authentication component 106 may manage accounts associated with users and/or consumers of system 100. The user accounts may include user information associated with users and/or consumers of the user accounts. User information may include information stored by server(s) 102, one or more client computing platform(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a computing platform identification associated with the user and/or consumer, a phone number associated with the user and/or consumer, privacy settings information, and/or other information related to users and/or consumers.

Authentication component 106 may be configured to obtain user information via one or more client computing platform(s) 104 (e.g., user input via a user interface, etc.). If a user and/or consumer does not have a preexisting user account associated with system 100, a user and/or consumer may register to receive services provided by server 102 via a website, web-based application, mobile application, and/or user application. Authentication component 106 may be configured to create a user ID and/or other identifying information for a user and/or consumer when the user and/or consumer registers. The user ID and/or other identifying information may be associated with one or more client computing platforms 104 used by the user and/or consumer. Authentication component 106 may be configured to store such association with the user account of the user and/or consumer. A user and/or consumer may associate one or more accounts associated with social network services, messaging services, and the like with an account provided by system 100.

Segment component 108 may be configured to obtain a first portion of a first video segment from a user. Segment component 108 may be configured to obtain a second portion of a second video segment from the user. The first video segment and the second video segment may be available within the repository of video segments available via system 100 and/or available on a third party platform, which may be accessible and/or available via system 100. Segment component 108 may be configured to receive a selection of the first portion of the first video segment from the user. The user may select the first portion of the first video segment via a user interface associated with system 100 available via one or more client computing platform(s) 104. Segment component 108 may receive a first start time and/or a first end time associated with the first portion of the first video segment. The first start time and/or the first end time may be received from the user via a user selection. If segment component 108 receives a selection of the first start time, segment component 108 may be configured to automatically select the first end time of the first portion to be the end of the first video segment and/or may be configured, via user defined settings within system 100 and/or other configurations of system 100, to select a portion of the video segment of a particular length of time based upon the received first start time. Segment component 108 may be configured to receive a second start time and/or a second end time associated with the second portion of the second video segment in a similar manner. The first portion and/or the second portion may be stored by server(s) 102, client computing platforms 104, and/or other storage locations.

The first video segment and/or the second video segment may be video segments captured by the user via one or more client computing platform(s) 104 and/or may be video segments captured by other users. The first video segment and the second video segment may be the same video segment or may be different video segments. If the first video segment and the second video segment are the same video segment, the first portion and the second portion may be different portions and/or overlapping portions of the same video segment. Segment component 108 may obtain any number of portions of any number of video segments.

Aggregation component 110 may be configured to aggregate the first portion and the second portion to form an aggregated video segment. Aggregation component 110 may receive a selection of an order in which to aggregate the first portion and the second portion. If aggregation component 110 does not receive an order to aggregate the first portion and the second portion, aggregation component 110 may be configured to aggregate the first portion and the second portion automatically based upon the order in which the portions were received by system 100, based upon user defined settings of system 100, and/or other configurations of system 100. Any number of portions of any number of video segments may be included within the aggregated video segment. The aggregated video segment may be included within the repository of images and/or video segments available via system 100. The aggregated video segment may be stored by server(s) 102, client computing platforms 104, and/or other storage locations.

Figure 2:
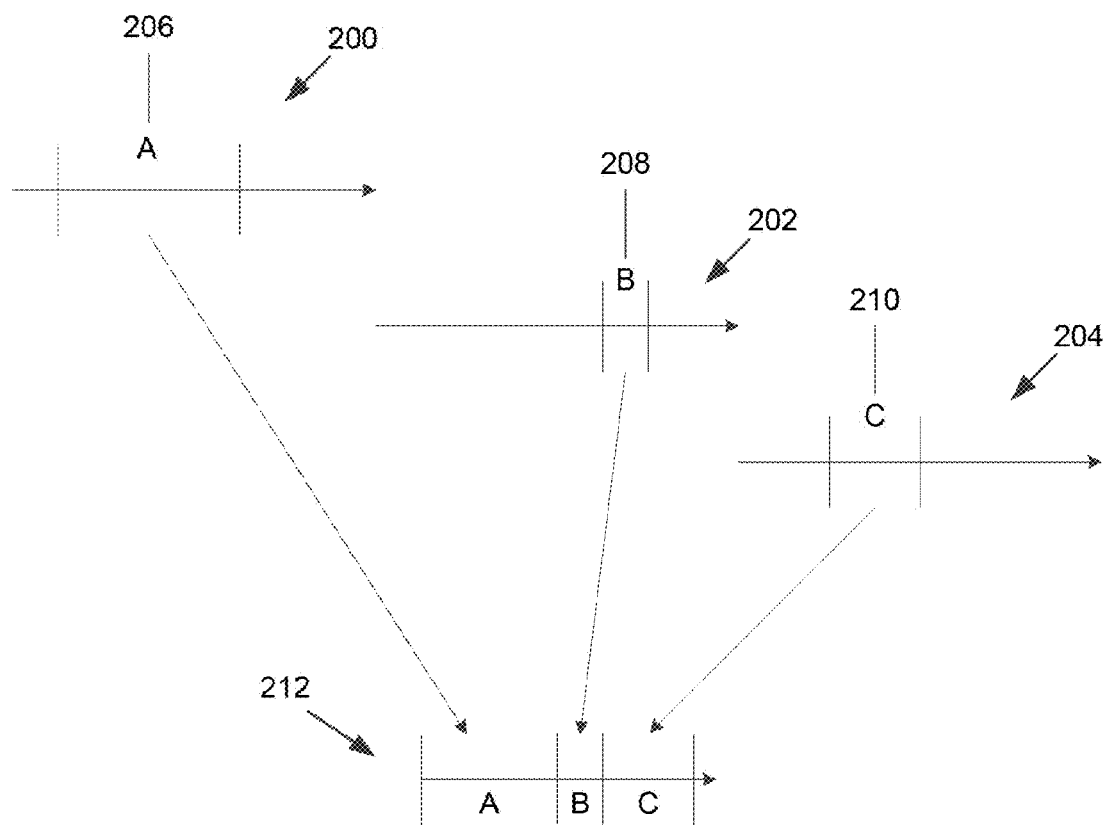
FIG. 2 illustrates an exemplary aggregated video segment, in accordance with one or more implementations.

For example and referring to FIG. 2, first video segment 200, second video segment 202, and third video segment 204 may be included within the repository of video segments available via system 100. System 100 may receive a selection of first portion 206 (e.g., portion A) of first video segment 200, a selection of second portion 208 (e.g., portion B) of second video segment 202, and/or a selection of third portion 210 (e.g., portion C) of third video segment 204. System 100 may aggregate first portion 206, second portion 208, and third portion 210 to form aggregated video segment 212.

Referring back to FIG. 1, capture settings component 112 may be configured to obtain a first set of capture settings associated with capture of the first portion of the first video segment. Capture settings component 108 may be configured to obtain a second set of capture settings associated with capture of the second portion of the second video segment. Capture settings may define aspects of operation for one or more of a processor of the image capturing device that captured a video segment, an imaging sensor of the image capturing device that captured the video segment and/or portions of the video segment, and/or an optical element of the first capturing device that captured the video segment and/or portions of the video segment.

Capture settings of the image capturing device may include one or more of a shutter speed, a resolution, a frame rate, white balance, an exposure, a field of view, an aperture, focus modes, and/or other capture settings. Capture settings of the image capturing device may be based upon a position of the image capturing device (including a position of a first image capturing device within a group of image capturing devices with respect to positions of the other image capturing devices within the group of image capturing devices and/or a mounting position of the image capturing device) and/or a perspective of the image capturing device.

In some implementations, capture settings may correspond to one or more cinematic settings of a video segment. Cinematic settings may correspond to one or more cinematography effects set by a user and/or the image capturing device when the video segment was captured. For example, cinematic settings may include one or more of a camera perspective, camera mounting position, shot framing, shot filter, lighting arrangement, a shot transition, a frame rate, a resolution, shutter speed, and/or other cinematic settings that may be determined from the video segment.

Capture settings may be determined based upon one or more of feature point and/or object detection techniques, output from one or more sensors of the image capturing device that captured the video segment and/or portions of the video segment, predetermined settings of the image capturing device that captured the video segment and/or portions of the video segment, settings preconfigured by a user prior to, during, and/or after capture, and/or other techniques. For example, settings of the image capturing device that captured the video segment and/or portions of the video segment may include one or more of a frame rate, resolution, shutter speed, field of view, time lapse interval, low light mode, photo mode, white balance, color, ISO, sharpness, exposure, and/or other settings. Feature point and/or object detection techniques may determine one or more of a camera perspective, camera mounting position, shot framing, and/or other information.

Capture settings component 112 may determine capture settings of the image capturing device that captured the individual portions of the video segments directly from the video segment, via metadata associated with the video segment and/or portions of the video segment, and/or via tags associated with the video segment and/or portions of the video segment. At the time when the video segment was captured and/or stored, capture settings of the image capturing device capturing the video segment may have been recorded and/or stored in memory and associated with the video segment and/or portions of the video segment. Capture settings may vary throughout a given video segment, as different portions of the video segment at different points in time of the video segment may be associated with different capture settings of the image capturing device. Capture settings component 112 may determine the first set of capture settings associated with capture of the first portion of the first video segment directly from the first video segment. Capture settings component 112 may obtain the first set of capture settings associated with capture of the first portion of the first video segment via metadata and/or tags associated with the first portion of the first video segment. Capture settings component 112 may determine the second set of capture settings associated with capture of the second portion of the second video segment directly from the second video segment. Capture settings component 112 may obtain the second set of capture settings associated with capture of the second portion of the second video segment via metadata and/or tags associated with the second portion of the second video segment.

Capture settings component 112 may be configured to obtain capture settings associated with other portions of the first video segment and the second video segment that were not selected and/or obtained to be included within the aggregated video segment. Capture settings associated with other portions of the first video segment and the second video segment that were not selected and/or obtained to be included within the aggregated video segment may be obtained in a similar manner as described above. Capture settings component 112 may be configured to determine differences between the capture settings associated with the other portions not included within the aggregated video segment and the first set of capture settings and the second set of capture settings. The differences between the capture settings associated with the other portions not included within the aggregated video segment and the first set of capture settings and the second set of capture settings may represent preferences associated with the user for capture settings.

Preferences component 114 may be configured to determine the preferences for the capture settings of the image capturing device based upon the first set of capture settings, the second set of capture settings, and/or the differences between the capture settings associated with the other portions of the first video segment and the second video segment that were not included within the aggregated video segment. For example, the preferences for the capture settings for the image capturing device may be determined based upon the obtained first set of capture settings associated with the first portion of the first video segment, such that the preferences for the capture settings may be determined to be the same as the first set of capture settings. The preferences for the capture settings for the image capturing device may be determined based upon the obtained second set of capture settings associated with the second portion of the second video segment, such that the preferences for the capture settings may be determined to be the same as the second set of capture settings. The preferences for the capture settings for the image capturing device may be a combination of the first set of capture settings, the second set of capture settings, and/or the differences between the capture settings associated with the other portions of the first video segment and the second video segment that were not included within the aggregated video segment. The combination may be based upon commonalities between the first set of capture settings and the second set of capture settings, such that the preferences for the capture settings for the image capturing device may be determined to be the common capture settings between the first set of capture settings and the second set of capture settings. The combination may be based upon commonalities between the differences between the capture settings associated with the other portions of the first video segment and the second video segment that were not included within the aggregated video segment. For example, if a particular capture setting is common in the other portions of the first video segment and the second video segment not included within the aggregated video segment, system 100 may determine that the particular capture setting may not be a preference of the user for capture settings and may exclude it from the preferences even if the first portion of the first video segment and/or the second portion of the second video segment includes that particular capture setting. Different capture settings may be given different priorities in terms of importance based upon user defined settings and/or configurations of system 100. The preferences for the capture settings may be associated with the user who selected the first portion of the first video segment and the second portion of the second video segment.

Commonalities between the first portion of the first video segment and the second portion of the second video segment may include common contextual information associated with capture of the first portion of the first video segment and capture of the second portion of the second video segment. Contextual information associated with capture of the video segments and/or portions of video segments may define one or more temporal attributes and/or spatial attributes associated with capture of the video segments and/or portions of video segments. Contextual information may include any information pertaining to an environment in which the video segment and/or portions of the video segment were captured. Contextual information may include visual and/or audio information based upon the environment in which the video segment and/or portions of the video segment were captured. Temporal attributes may define a time in which the video segment and/or portions of the video segment were captured (e.g., date, time, time of year, season, etc.). Spatial attributes may define the environment in which the video segment and/or portions of the video segment were captured (e.g., location, landscape, weather, surrounding activities, etc.). The one or more temporal attributes and/or spatial attributes may include one or more of a geolocation attribute, a time attribute, a date attribute, and/or a content attribute. System 100 may obtain contextual information associated with capture of the video segments and/or portions of the video segments directly from the video segments, via metadata associated with the video segments and/or portions of the video segments, and/or tags associated with the video segments and/or portions of the video segments. For example, different portions of the video segments may include different tags and/or may be associated with different metadata including contextual information and/or capture setting information.

A geolocation attribute may include a physical location of where the video segment and/or portions of the video segments were captured. The geolocation attribute may correspond to one or more of a compass heading, one or more physical locations of where the video segment and/or portions of the video segment were captured, a pressure at the one or more physical locations, a depth at the one or more physical locations, a temperature at the one or more physical locations, and/or other information. Examples of the geolocation attribute may include the name of a country, region, city, a zip code, a longitude and/or latitude, and/or other information relating to a physical location where the video segment and/or portions of the video segment were captured. A single video segment may include more than one geolocation attribute based upon different portions of the video segment being captured in different locations. For example, the image capturing device may be in motion, and thus a single video segment may include different locations based upon where the image capturing device began capturing the video segment and where the image capturing device stopped capturing the video segment.

A time attribute may correspond to a one or more timestamps associated with when the video segment and/or portions of the video segment were captured. Examples of the time attribute may include a time local to the physical location (which may be based upon the geolocation attribute) of when the video segment and/or portions of the video segment were captured, the time zone associated with the physical location, and/or other information relating to a time when the video segment and/or portions of the video segment were captured. A single video segment may include more than one time attribute based upon different portions of the video segment being captured at different times and/or different locations. For example, a single video segment may span hours of continuous recording, such that different timestamps may be associated with different portions of the video segment.

A date attribute may correspond to a one or more of a date associated with when the video segment and/or portions of the video segment were captured, seasonal information associated with when the video segment and/or portions of the video segment were captured, and/or a time of year associated with when the video segment and/or portions of the video segment were captured.

A content attribute may correspond to one or more of an action depicted within the video segment and/or portions of the video segment, one or more objects depicted within the video segment and/or portions of the video segment, and/or a landscape depicted within the video segment and/or portions of the video segment. For example, the content attribute may include a particular action (e.g., running), object (e.g., a building), and/or landscape (e.g., beach) portrayed and/or depicted in the video segment. One or more of an action depicted within the video segment and/or portions of the video segment may include one or more of sport related actions, inactions, motions of an object, and/or other actions. One or more of an object depicted within the video segment and/or portions of the video segment may include one or more of a static object (e.g., a building), a moving object (e.g., a moving train), a particular actor (e.g., a body), a particular face, and/or other objects. A landscape depicted within the video segment and/or portions of the video segment may include scenery such as a desert, a beach, a concert venue, a sports arena, etc. Content of the video segment and/or portions of the video segment may be determined based upon object detection of content included within the video segment and/or portions of the video segment.

Preferences component 114 may determine and/or obtain contextual information associated with capture of the first portion of the first video segment, the second portion of the second video segment, and/or the other portions of the first video segment and the second video segment not included within the aggregated video segment. Based upon commonalities between the contextual information associated with capture of the first portion of the first video segment and the second portion of the second video segment, preferences component 114 may determine the preferences for the capture settings of the image capturing device to be common capture settings between the first set of capture settings and the second set of capture settings where contextual information associated with capture of the first portion of the first video segment is similar to contextual information associated with capture of the second portion of the second video segment. Preferences component 114 may determine the preferences for the capture settings of the image capturing device based upon commonalities between the contextual information associated with capture of the other portions of the first video segment and the second video segment not included within the aggregated video segment.

Transmission component 116 may be configured to effectuate transmission of instructions to the image capturing device. The instructions may include the determined preferences for the capture settings. The instructions may be configured to cause the image capturing device to adjust the capture settings of the image capturing device to the determined preferences. The instructions may be configured to cause the image capturing device to automatically adjust the capture settings of the image capturing device to the determined preferences the next time the image capturing device is activated (e.g., turned on, in use, and/or capturing an image and/or video segment) or each time the image capturing device is activated. The image capturing device may adjust the capture settings prior to capturing an image and/or video segment and or during capture of an image and/or video segment.

The instructions may be configured to cause the image capturing device to automatically adjust the capture settings of the image capturing device to the determined preferences based upon current contextual information associated with the image capturing device and current capture settings of the image capturing device. The current contextual information may define current temporal attributes and/or current spatial attributes associated with the image capturing device. The current contextual information, current temporal attributes, and/or current spatial attributes may be similar to the contextual information, temporal attributes, and/or spatial attributes discussed above. System 100 and/or the image capturing device may determine and/or obtain current temporal attributes and/or current spatial attributes in real-time. Contextual information may include any information pertaining to an environment in which the image capturing device is in and/or surrounded by. Contextual information may be obtained via one or more sensors internal and/or external to the image capturing device. The contextual information may be transmitted to system 100 via image capturing device and/or directly from one or more sensors external to the image capturing device.

The geolocation attribute may be determined based upon one or more of geo-stamping, geotagging, user entry and/or selection, output from one or more sensors (external to and/or internal to the image capturing device), and/or other techniques. For example, the image capturing device may include one or more components and/or sensors configured to provide one or more of a geo-stamp of a geolocation of a current video segment prior to, during, and/or post capture of the current video segment, output related to ambient pressure, output related to depth, output related to compass headings, output related to ambient temperature, and/or other information. For example, a GPS of the image capturing device may automatically geo-stamp a geolocation of where the current video segment is captured (e.g., Del Mar, Calif.). The user may provide geolocation attributes based on user entry and/or selection of geolocations prior to, during, and/or post capture of the current video segment.

The time attribute may be determined based upon timestamping and/or other techniques. For example, the image capturing device may include an internal clock that may be configured to timestamp the current video segment prior to, during, and/or post capture of the current video segment (e.g., the image capturing device may timestamp the current video segment at 1 PM PST). In some implementations, the user may provide the time attribute based upon user entry and/or selection of timestamps prior to, during, and/or post capture of the current video segment.

The date attribute may be determined based upon date stamping and/or other techniques. For example, the image capturing device may include an internal clock and/or calendar that may be configured to date stamp the current video segment prior to, during, and/or post capture of the current video segment. In some implementations, the user may provide the date attribute based upon user entry and/or selection of date stamps prior to, during, and/or post capture of the current video segment. Seasonal information may be based upon the geolocation attribute (e.g., different hemispheres experience different seasons based upon the time of year).

The content attribute may be determined based upon one or more action, object, landscape, and/or composition detection techniques. Such techniques may include one or more of SURF, SIFT, bounding box parameterization, facial recognition, visual interest analysis, composition analysis (e.g., corresponding to photography standards such as rule of thirds and/or other photography standards), audio segmentation, visual similarity, scene change, motion tracking, and/or other techniques. In some implementations content detection may facilitate determining one or more of actions, objects, landscapes, composition, and/or other information depicted in the current video segment. Composition may correspond to information determined from composition analysis and/or other techniques. For example, information determined from composition analysis may convey occurrences of photography standards such as the rule of thirds, and/or other photograph standards. In another example, a sport related action may include surfing. The action of surfing may be detected based upon one or more objects that convey the act of surfing. Object detections that may convey the action of surfing may include one or more of a wave shaped object, a human shaped object standing on a surfboard shaped object, and/or other objects.

Upon determination of current contextual information associated with the image capturing device, the image capturing device may be configured to adjust the current capture settings to the determined preferences based upon the current contextual information and current capture settings of the image capturing device. The current capture settings may be the preferences for the capture settings included within the instructions. The current capture settings may be the last set of capture settings configured the last time the image capturing device was in use. The current capture settings may be pre-configured by the image capturing device.

Current contextual information may be transmitted to system 100 such that system 100 may determine preferences for capture settings of the image capturing device in real-time or near real-time based upon the first set of capture settings, the second set of capture settings, and/or capture settings associated with the other portions of the first video segment and the second video segment not included within the aggregated video segment. The current contextual information may be transmitted to system 100 prior to, during, and/or post capture of the current video segment. Transmission component 116 may be configured to effectuate transmission of instructions to the image capturing device in real-time or near real-time in response to receiving the current contextual information associated with capture of the current video segment.

For example, system 100 may determine that the first portion of first video segment, the second portion of the second video segment, and/or other portions included within the aggregated video segment include surfing. If a majority of the video portions that include surfing were captured with similar capture settings, and if system 100 receives current contextual information indicating that the user is currently capturing a video segment including surfing, then transmission component 116 may effectuate transmission of instructions to the image capturing device, in real-time or near real-time, to automatically adjust the capture settings of the image capturing device to the capture settings of the portions of the aggregated video segment which included surfing. Transmission component 116 may be configured to effectuate transmission of the instructions to the image capturing device prior to and/or during capture of the current video segment. The current capture settings of the image capturing device may be adjusted prior to and/or during capture of the current video segment. The current capture settings of image capturing device which are different from the determined preferences included within the instructions may be adjusted to the determined preferences included within the instructions.

This process may be continuous such that system 100 may transmit instructions to image capturing device based upon current contextual information associated with capture of a current video segment, current capture settings, and/or capture settings associated with portions of video segments included within an aggregated video segment produced by the user.

Figure 3:
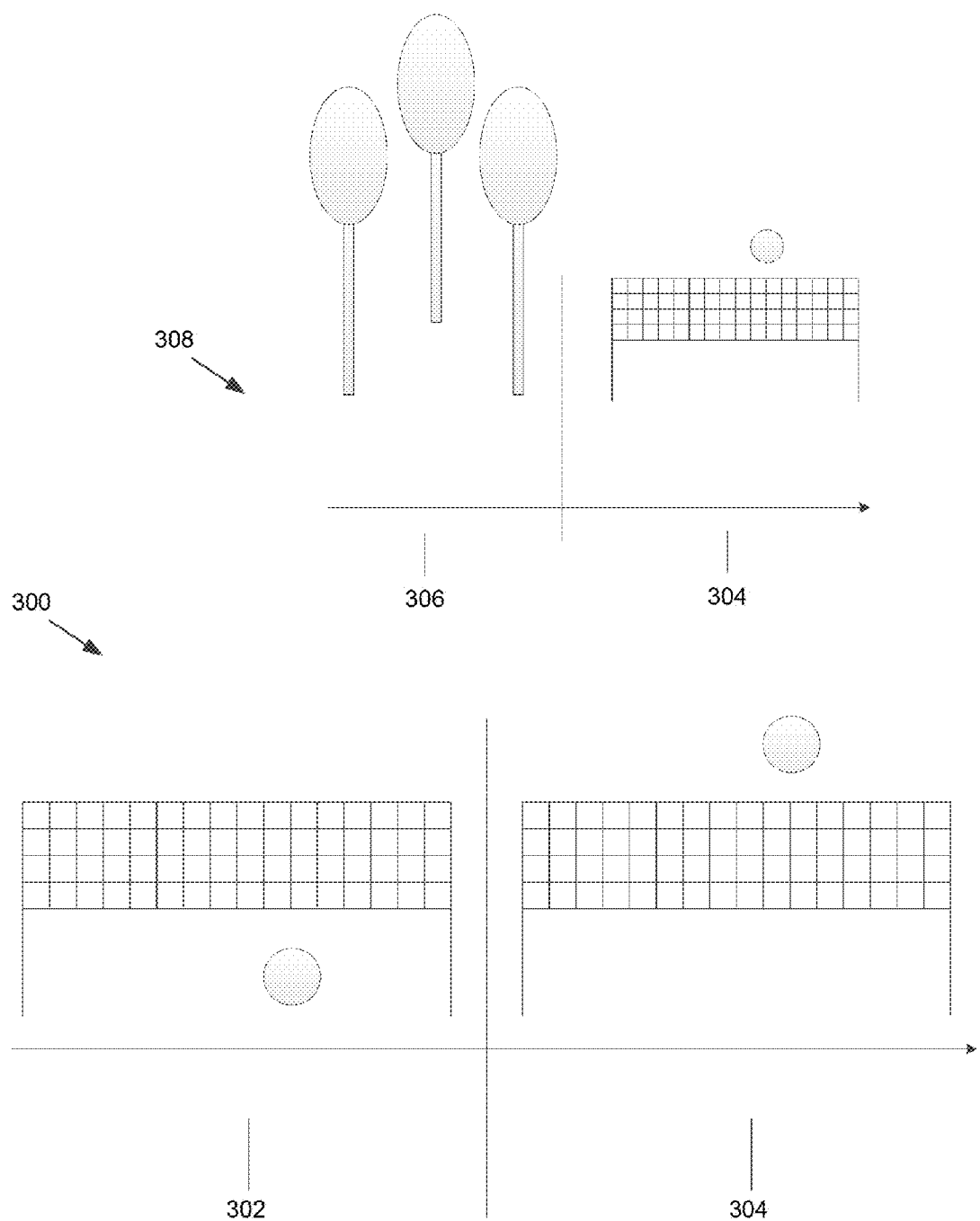
FIG. 3 illustrates content depicted within an aggregated video segment, in accordance with one or more implementations.

Referring to FIG. 3, aggregated video segment 300 is shown. Aggregated video segment 300 may include first portion 302 and second portion 304. System 100 may determine and/or obtain contextual information relating to capture of first portion 302 including that at least first portion 302 of aggregated video segment 300 depicts a game of volleyball. System 100 may determine and/or obtain contextual information relating to capture of second portion 304 including that at least second portion 304 of aggregated video segment 300 was captured in a park in San Diego and that a game of volleyball is depicted within second portion 304 of aggregated video segment 300. Portion 306 of video segment 308, which may not have been selected to be included within aggregated video segment 300, may simply depict the park. System 100, via capture settings component 112 of FIG. 1, may obtain a first set of capture settings associated with capture of first portion 302, a second set of capture settings associated with capture of second portion 304, and/or capture settings associated with portion 306 not included within aggregated video segment 300 in a similar manner as described above. System 100, via preferences component 114 of FIG. 1, may determine the preferences for the capture settings of the image capturing device associated with the user based upon the obtained first and second sets of capture settings associated with capture of first portion 302 and second portion 304 in a similar manner as described above. System 100, via transmission component 116 of FIG. 1, may effectuate transmission of the preferences for the capture settings to the image capturing device associated with the user.

Figure 4:
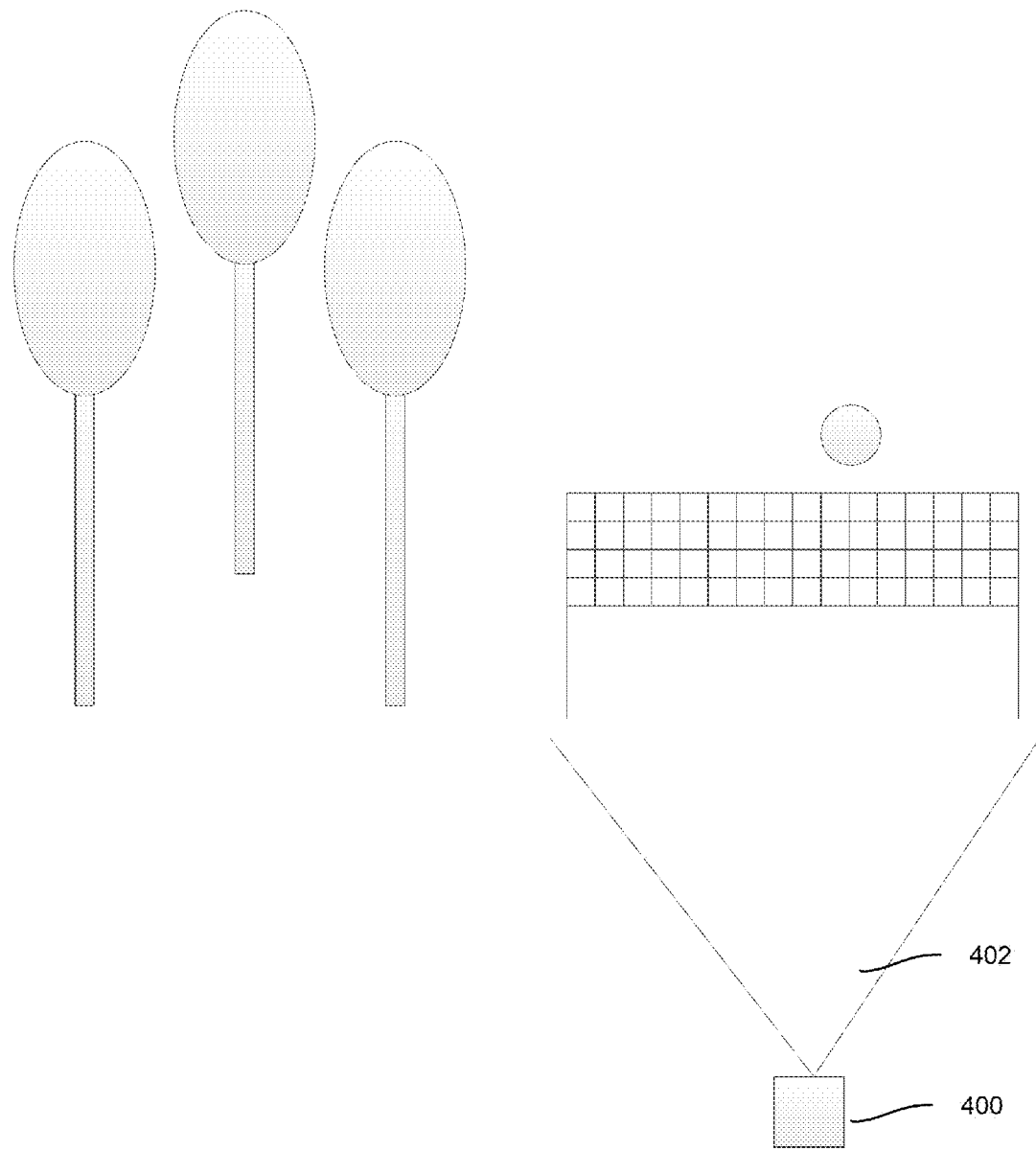
FIG. 4 illustrates a field of view of an image capturing device, in accordance with one or more implementations.

Referring to FIG. 4, image capturing device 400 is depicted. Image capturing device 400 may be located in a similar park as the park depicted in at least video segment 308 of FIG. 3. Image capturing device 400 may begin capturing a video of the park with current capture settings. The current capture settings of image capturing device 400 may include the last set of capture settings when image capturing device 400 was last in use, pre-configured capture settings by image capturing device 400, manual configuration by the user, adjusted capture settings based upon received instructions including preferences for the current capture settings from system 100 (e.g., the received instructions may have been in response to image capturing device 400 being located in a park with trees in field of view 402 of image capturing device 400), and/or other current settings of image capturing device 400. Upon a volleyball game entering field of view 402 of image capturing device 400, image capturing device 400 may be configured to automatically adjust the current capture settings to a set of preferred capture settings based upon instructions transmitted from system 100 while continuing to capture the video segment without interruption. The set of preferred capture settings included within the instructions may include the determined preferences for the capture settings based upon the first set of capture settings associated with capture of first portion 302, the second set of capture settings associated with capture of second portion 304, and/or capture settings associated with portion 306 not included within aggregated video segment 300 of FIG. 3.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, 116, and/or other components. The processor(s) 124 may be configured to execute components 106, 108, 110, 112, 114, 116, and/or other components by software; hardware; firmware; some combination of software, hardware, and/or firmware; and/or other mechanisms for configuring processing capabilities on processor(s) 124.

It should be appreciated that although components 106, 108, 110, 112, 114, and 116 are illustrated in FIG. 1 as being co-located within a single processing unit, in implementations in which processor(s) 124 includes multiple processing units, one or more of components 106, 108, 110, 112, 114, and/or 116 may be located remotely from the other components. The description of the functionality provided by the different components 106, 108, 110, 112, 114, and/or 116 described herein is for illustrative purposes, and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, and/or 116. As another example, processor(s) 124 may be configured to execute one or more additional components that may perform some or all of the functionality attributed herein to one of components 106, 108, 110, 112, 114, and/or 116.

Figure 5:
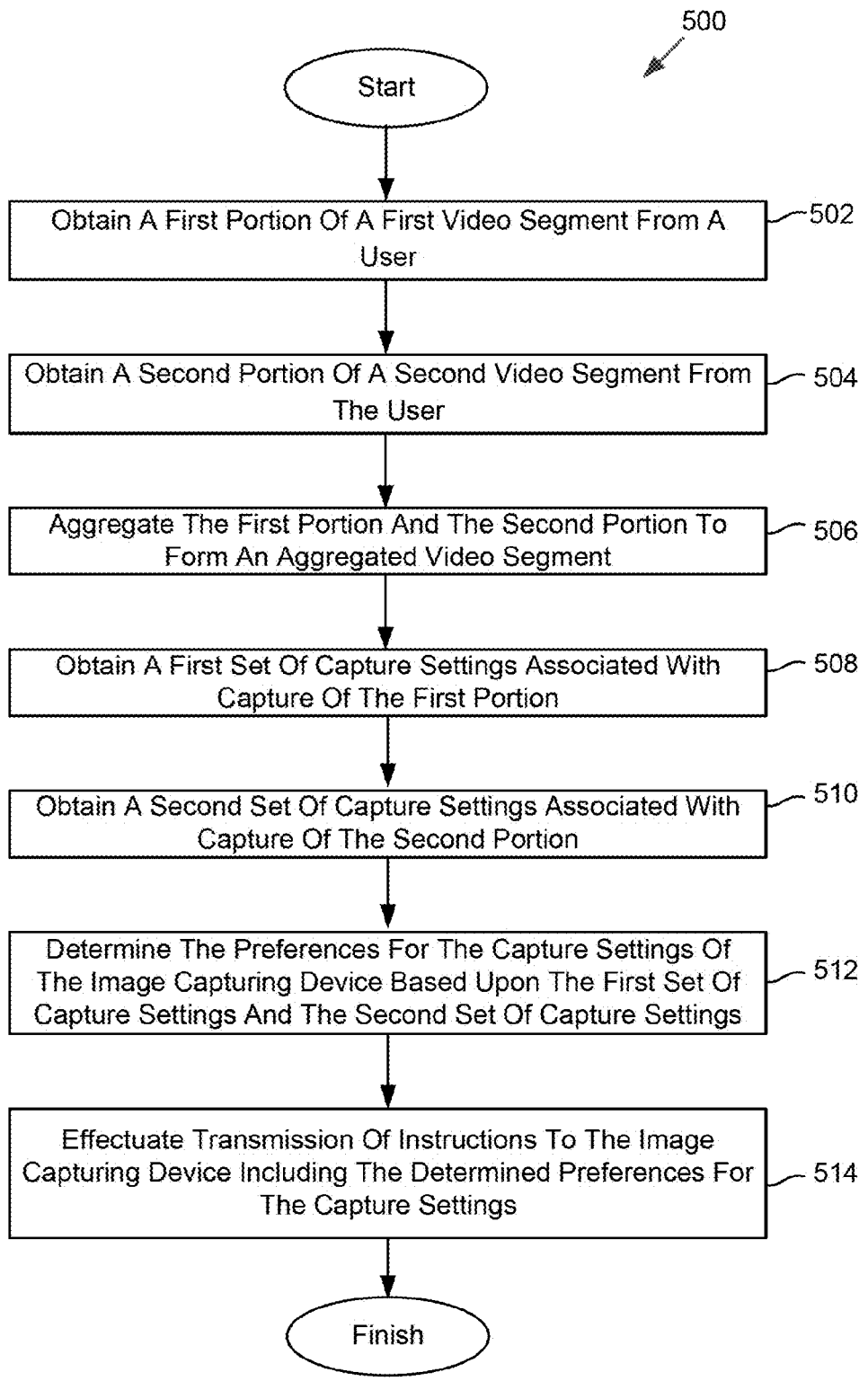
FIG. 5 illustrates a method for determining preferences for capture settings of an image capturing device, in accordance with one or more implementations.

FIG. 5 illustrates a method 500 for determining preferences for capture settings of an image capturing device, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a first portion of a first video segment may be obtained from a user. At an operation 504, a second portion of a second video segment may be obtained from the user. Operations 502 and 504 may be performed by a segment component that is the same as or similar to segment component 108, in accordance with one or more implementations.

At an operation 506, the first portion of the first video segment and the second portion of the second video segment may be aggregated to form an aggregated video segment. Operation 506 may be performed by an aggregation component that is the same as or similar to aggregation component 110, in accordance with one or more implementations.

At an operation 508, a first set of capture settings associated with capture of the first portion of the first video segment may be obtained. At an operation 510, a second set of capture settings associated with capture of the second portion of the second video segment may be obtained. Operations 508 and 510 may be performed by a capture settings component that is the same as or similar to capture settings component 112, in accordance with one or more implementations.

At an operation 512, preferences for the capture settings of the image capturing device may be determined based upon the first set of capture settings and the second set of capture settings. Operation 512 may be performed by a preferences component that is the same as or similar to preferences component 114, in accordance with one or more implementations.

At an operation 514, instructions including the determined preferences may be transmitted to the image capturing device. Operation 514 may be performed by a transmission component that is the same as or similar to transmission component 116, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining preferences for capture settings of an image capturing device, the system comprising:

one or more physical computer processors configured by computer readable instructions to:

obtain a first portion of a first video segment from a user;

obtain a second portion of a second video segment from the user;

aggregate the first portion and the second portion to form an aggregated video segment;

obtain a first set of capture settings associated with capture of the first portion;

obtain a second set of capture settings associated with capture of the second portion;

determine the preferences for the capture settings of the image capturing device based upon the first set of capture settings and the second set of capture settings, the preferences for the capture settings being associated with the user, wherein the capture settings define aspects of operation for one or more of a processor of the image capturing device, an imaging sensor of the image capturing device, and/or an optical element of the image capturing device; and effectuate transmission of instructions to the image capturing device, the instructions including the determined preferences for the capture settings and being configured to cause the image capturing device to adjust the capture settings to the determined preferences; and wherein the image capturing device is configured to adjust the capture settings to the determined preferences based upon current contextual information that defines one or more current temporal attributes and/or current spatial attributes associated with the image capture device and current capture settings of the image capturing device.

2. The system of claim 1, wherein the one or more physical computer processors is further configured by computer readable instructions to:

obtain capture settings associated with other portions of the first video segment and the second video segment not included within the aggregated video segment; and determine differences between the capture settings associated with the other portions not included within the aggregated video segment and the first set of capture settings and the second set of capture settings.

3. The system of claim 2, wherein the preferences for the capture settings of the image capturing device is determined based upon the first set of capture settings, the second set of capture settings, and/or the differences between the capture settings associated with the other portions not included within the aggregated video segment.

4. The system of claim 1, wherein the one or more current temporal attributes and/or current spatial attributes include one or more of a geolocation attribute, a time attribute, a date attribute, and/or a content attribute.

5. The system of claim 4, wherein the geolocation attribute includes a location of the image capturing device capturing a current video segment.

6. The system of claim 5, wherein the time attribute includes a timestamp associated with when the current video segment was captured.

7. The system of claim 5, wherein the date attribute includes one or more of a date associated with when the current video segment was captured, seasonal information associated with when the current video segment was captured, and/or a time of year associated with when the current video segment was captured.

8. The system of claim 5, wherein the content attribute includes one or more of an action depicted within the current video segment, one or more objects depicted within the current video segment, and/or a landscape depicted within the current video segment.

9. The system of claim 1, wherein the capture settings includes one or more of a shutter speed, a resolution, a frame rate, white balance, an exposure, a field of view, an aperture, and/or focus modes.

10. A method for determining preferences for capture settings of an image capturing device, the method comprising:

obtaining a first portion of a first video segment from a user;

obtaining a second portion of a second video segment from the user;

aggregating the first portion and the second portion to form an aggregated video segment;

obtaining a first set of capture settings associated with capture of the first portion;

obtaining a second set of capture settings associated with capture of the second portion;

determining the preferences for the capture settings of the image capturing device based upon the first set of capture settings and the second set of capture settings, the preferences for the capture settings being associated with the user, wherein the capture settings define aspects of operation for one or more of a processor of the image capturing device, an imaging sensor of the image capturing device, and/or an optical element of the image capturing device;

effectuating transmission of instructions to the image capturing device, the instructions including the determined preferences for the capture settings and being configured to cause the image capturing device to adjust the capture settings to the determined preferences; and wherein the image capturing device is configured to adjust the capture settings to the determined preferences based upon current contextual information that defines one or more current temporal attributes and/or current spatial attributes associated with the image capture device and current capture settings of the image capturing device.

11. The method of claim 10, further comprising:

obtaining capture settings associated with other portions of the first video segment and the second video segment not included within the aggregated video segment; and determining differences between the capture settings associated with the other portions not included within the aggregated video segment and the first set of capture settings and the second set of capture settings.

12. The method of claim 11, wherein the preferences for the capture settings of the image capturing device is determined based upon the first set of capture settings, the second set of capture settings, and/or the differences between the capture settings associated with the other portions not included within the aggregated video segment.

13. The method of claim 10, wherein the one or more current temporal attributes and/or current spatial attributes include one or more of a geolocation attribute, a time attribute, a date attribute, and/or a content attribute.

14. The method of claim 13, wherein the geolocation attribute includes a location of the image capturing device capturing a current video segment.

15. The method of claim 14, wherein the time attribute includes a timestamp associated with when the current video segment was captured.

16. The method of claim 14, wherein the date attribute includes one or more of a date associated with when the current video segment was captured, seasonal information associated with when the current video segment was captured, and/or a time of year associated with when the current video segment was captured.

17. The method of claim 14, wherein the content attribute includes one or more of an action depicted within the current video segment, one or more objects depicted within the current video segment, and/or a landscape depicted within the current video segment.

18. The method of claim 10, wherein the capture settings includes one or more of a shutter speed, a resolution, a frame rate, white balance, an exposure, a field of view, an aperture, and/or focus modes.

* * * * *